F. C. PECK.
SHOCK ABSORBER FOR VEHICLES.
APPLICATION FILED SEPT. 10, 1915.
1,188,821.
Patented June 27, 1916.
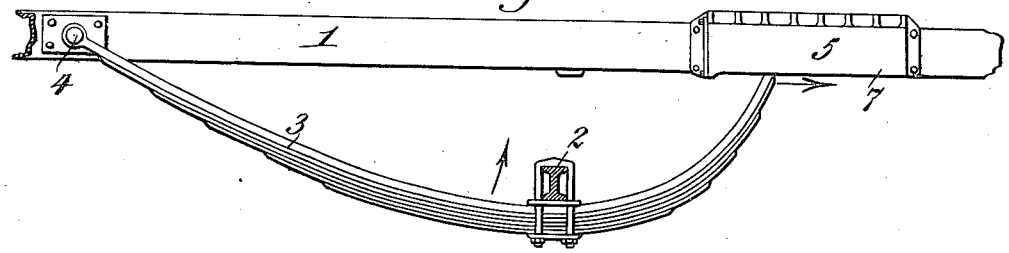
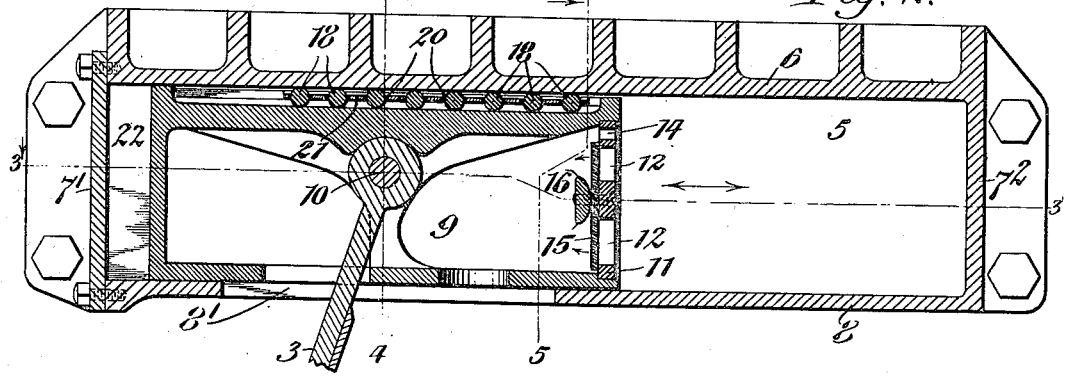
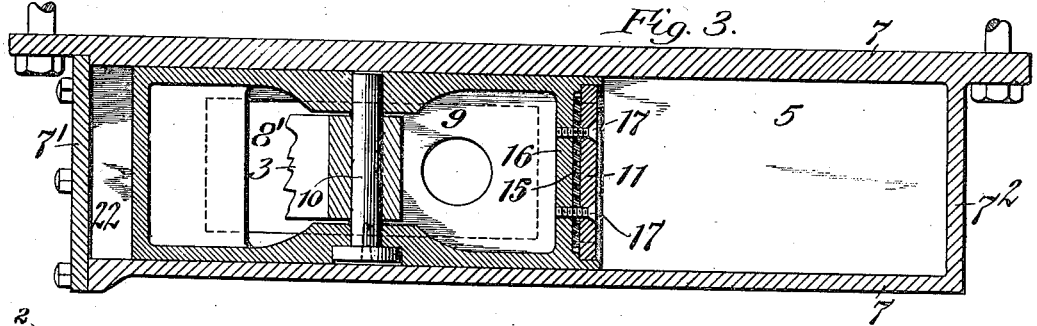
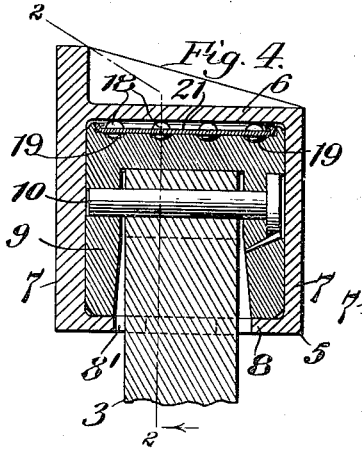
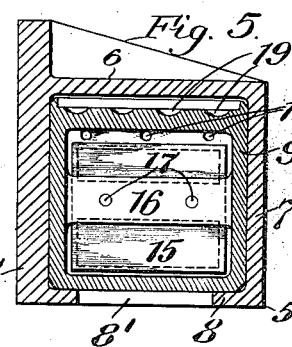
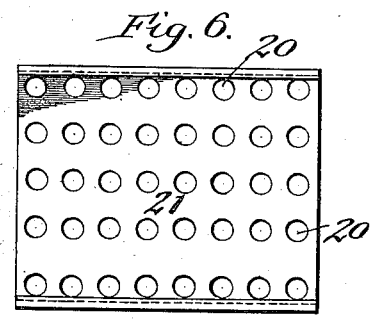
Inventor
Fred C. Peck
by Geyer & Goff Attorneys

UNITED STATES PATENT OFFICE.

FRED C. PECK, OF BUFFALO, NEW YORK.

SHOCK-ABSORBER FOR VEHICLES.

1,188,821.  Specification of Letters Patent.  Patented June 27, 1916.

Application filed September 10, 1915. Serial No. 49,887.

*To all whom it may concern:*

Be it known that I, FRED C. PECK, a citizen of the United States, residing at Buffalo, in the county of Erie and State of New York, have invented new and useful Improvements in Shock-Absorbers for Vehicles, of which the following is a specification.

This invention relates to a shock absorbing device which offers practically no resistance to the normal upward action of the vehicle spring to which it is attached but which offers considerable resistance during the return movement of said spring and thereby avoids the dangerous and irritating oscillations which ordinarily continue sometime subsequent to riding over rough or uneven roads.

The object of this invention is to provide an improved device for this purpose which coöperates with an end of a semi-elliptical spring, which is comparatively simple and durable in construction, which is efficient and reliable in operation and which is conveniently accessible for inspection, adjustment and repairs.

In the accompanying drawings: Figure 1 is a side elevation of the shock absorber as mounted on the vehicle chassis together with one of the vehicle springs with which it works. Fig. 2 is a vertical longitudinal section of the shock absorber taken on line 2—2, Fig. 4. Fig. 3 is a horizontal longitudinal section of the same taken on line 3—3, Fig. 2. Figs. 4 and 5 are vertical transverse sections taken on the corresponding lines of Fig. 2. Fig. 6 is a top plan view of the ball retainer.

Similar characters of reference indicate corresponding parts throughout the several views.

1 indicates one of the main longitudinal frame bars of an automobile or other vehicle, 2 one of the transverse axles or supports, and 3 a supporting spring preferably of semi-elliptical and leaf form connected with its central part to said axle and pivotally connected with one of its upturned ends by a pin 4 to the frame bar while its other upturned end is connected with this frame bar by means of my improved shock absorber. This spring may be of semi-elliptical or any other suitable form but that shown is preferred in which the free er·l of the spring adjacent to the shock absorber is given a sharp upward bend so as to increase the longitudinal movement of the free spring end, which movement, in the ordinary spring suspension, must be deemed an unavoidable objection, but is most advantageously utilized by the use of this shock absorber. Furthermore, any suspension spring which is pivotally mounted at its forward end on the frame readily permits the axle 3 to move upwardly and backwardly and thereby lessens the violence of the shock by increasing the time during which it acts and also decreasing the horizontal rearward force imparted to the vehicle when suddenly passing over an abrupt obstacle.

5 indicates the frame or body of the absorber which is preferably constructed in the form of a piston chamber which is square in cross section and secured to said frame. As shown this piston chamber comprises an upper flat plate 6, two longitudinal upright side guide walls 7, a bottom retaining wall 8 and two transverse walls $7^1$, $7^2$ arranged at the front and rear ends of the body. The bottom retaining wall is provided with a longitudinal rectangular opening $8^1$ through which passes the rear end of the spring 3. Reciprocating longitudinally in the body is a hollow piston 9 which has its interior opening to the external atmosphere and which is pinned to the rear end of the spring by means of a wrist pin 10 so that when the axle 3 moves up and down the piston is caused to move back and forth longitudinally in the body. Air valves are suitably arranged in the absorber so that the piston moves freely outwardly while said valves are open but which valves are closed during the return movement of the piston and thereby arresting the too violent drop of the spring and axle. These valves are preferably arranged in the outer piston head so that the inertia of said valves insures their prompt closing and also so that excessive outside dusty air may not be drawn into the body. In this construction as best shown in Figs. 2, 3 and 5, a detachable valve head 11 is fastened to the rear end of the piston, said head being provided with two rectangular valve openings 12 and 12 arranged one above the other and also three round vent openings 14 arranged adjacent to the upper edge of said valve head. These vent openings are not absolutely necessary inasmuch as the air may pass between the piston and the bore of the body or otherwise but said openings are preferred.

To the forward side of the valve head is secured a flexible valve flap 15 which moves forwardly and uncovers the valve openings 12 and 12 when the piston advances during the flexing movement of the vehicle spring but which moves rearwardly and covers said openings when the piston moves forwardly during the relaxing movement of said spring. During this forward movement, the air passes more or less slowly through the vent openings 14, so that the spring returns or relaxes gradually and without vibration to its initial position. A transverse supporting bar 16 is arranged horizontally across the rear part of the piston to which is secured the detachable valve head 11 with its valve flap by means of two machine screws 17 passing from the valve head through the valve flap and into the said transverse bar. For cushioning the return of the spring should the valve flap refuse to reseat, a pocket 22 is formed at the forward end of the body so that in the event of the piston moving forwardly of the position shown in the drawings, a very rapidly increasing resistance would be encountered by reason of the front end of the piston entering the pocket 22 in the manner of a dash pot.

The frictional resistance set up between the upper flat plate 6 of the piston chamber and the top of the piston, due to the longitudinal motion of the latter, may be lessened by any suitable means. In the preferred form, these means consist of a number of rows of bearing balls 18 each row being arranged in a longitudinal shallow groove 19 in the upper side of the piston and each ball in each row being separately retained in a hole 20 formed in a flat ball retainer 21, so that all the balls are forced to roll in unison.

Inasmuch as the piston need not be air tight and only crude materials and workmanship are required in the production of this absorber, it can be constructed at low cost and yet most effectively ease the undesirable drop of the spring after the same has received a heavy upward pressure.

The device can readily be applied in most cases to vehicles not so equipped; in use it will stand hard wear and as the ball bearings require little or no oil a minimum of care is required for its maintenance.

I claim as my invention:

1. A shock absorber for vehicles comprising a piston chamber rigidly mounted on the vehicle, a piston arranged to reciprocate said chamber, a vehicle spring connected at one of its ends to said piston, and means for permitting free escape of air from said chamber when the spring flexes and for constraining the flow of air into said chamber when the spring returns.

2. A shock absorber for vehicles comprising a piston chamber rigidly mounted on the vehicle, a piston arranged to reciprocate in said chamber, a vehicle spring connected at one of its ends to said piston, and means for permitting free escape of air from said chamber when the spring flexes and for constraining the flow of air into said chamber when the spring returns, said means being located in the head of said piston so that the inertia of their parts will aid their rapid action.

3. A shock absorber for vehicles comprising a horizontal piston chamber rigidly mounted on the vehicle, a piston arranged to reciprocate horizontally in said chamber and provided with a head, a vehicle spring pivotally connected at one of its ends to said piston, and an air valve arranged on the head of said piston, said valve moving forwardly relatively to the piston when the latter moves rearwardly and moving rearwardly relative to the piston when the latter moves forwardly so that the inertia of said valve insures its prompt action.

4. A shock absorber for vehicles comprising a vehicle spring, a piston chamber arranged horizontally on the vehicle and having both ends closed so that pockets are formed in either end thereof, a piston moving longitudinally in said chamber and connected with one end of said vehicle spring and having a removable head provided with valve openings, a supporting bar arranged across the front end of said piston, and a screw for securing said head and valve to said bar.

5. A shock absorber for vehicles comprising an elliptical vehicle spring, a piston chamber having one of its ends closed and arranged horizontally on a vehicle, a piston arranged in said chamber and pivoted to one end of said elliptical vehicle spring and provided with a longitudinal groove on its upper surface, a row of bearing balls arranged in said groove, and an air valve for the closed end of the piston chamber.

6. A shock absorber comprising an air piston chamber arranged on the frame of a vehicle, a vehicle spring arranged on said vehicle, a piston reciprocating in said chamber and connected with said spring and a rolling bearing interposed between one longitudinal side of the chamber and the opposing longitudinal side of the piston.

FRED C. PECK.